United States Patent [19]

Martin et al.

[11] 3,943,060

[45] Mar. 9, 1976

[54] FRICTION REDUCING

[75] Inventors: Fred David Martin, McMurray; Jerry Emile Boothe, Pittsburgh, both of Pa.

[73] Assignee: Calgon Corporation, Pittsburgh, Pa.

[22] Filed: July 26, 1974

[21] Appl. No.: 492,092

[52] U.S. Cl. ............... 252/8.55 R; 137/13; 166/307; 166/308; 252/2; 252/8.55 C
[51] Int. Cl.² ...................... F17D 1/16; E21B 43/26
[58] Field of Search .................. 252/8.55 R, 8.55 C; 166/307, 308; 137/13

[56] References Cited
UNITED STATES PATENTS

| | | | |
|---|---|---|---|
| 2,328,901 | 9/1943 | Grimm et al. | 260/67.5 X |
| 3,254,719 | 6/1966 | Root | 166/308 |
| 3,537,525 | 11/1970 | Sarem | 166/308 |
| 3,539,535 | 11/1970 | Wisner | 260/67.5 X |

*Primary Examiner*—Herbert B. Guynn
*Attorney, Agent, or Firm*—Rudolph J. Anderson, Jr.; Harry E. Westlake; Martin L. Katz

[57] ABSTRACT

Use of poly (dimethylaminomethyl acrylamide) as a friction reducer for aqueous fluids flowing through a conduit, especially for the aqueous hydraulic fracturing of subterranean formations.

4 Claims, No Drawings

FRICTION REDUCING

This invention is directed to the art of reducing the energy loss during the flow of aqueous fluids through pipes which by common usage in the oil field terminology has become known as "friction reduction." More particularly, our invention is directed to friction reduction in the aqueous hydraulic fracturing of subterranean formations. The aqueous fracturing fluid may be brine, fresh water, or acid. Our invention will also be useful in firefighting, hydraulic control systems, and in any other application where the energy loss of aqueous fluids flowing through a conduit is to be avoided.

It is well known that in the movement of aqueous fluids through conduits, friction is generated and hence energy is lost. This energy loss is apparent from the pressure drop entailed in moving the fluid through a given distance and is directly proportional to the velocity of the fluid. According to the well-known laws of fluid dynamics, as long as the critical Reynolds Number of a fluid medium flowing through a conduit is not exceeded, the fluid moves in laminae which are actually aligned along the conduit. Under these conditions of laminar flow, the energy loss is minimal. However, when the velocity is greatly increased, the critical Reynolds Number is exceeded and turbulence occurs. This turbulence represents the change from laminar to nonlaminar flow. In addition, turbulence is increased by any irregularities in the conduit or in fracturing a subterranean formation by entering the formation. An increase in turbulence causes an increase in the amount of energy lost through friction.

In the art of producing oil or gas from a subterranean formation, it is well known that production can be greatly increased by hydraulically fracturing the formation. In a hydraulic fracturing operation, a fracturing fluid is forced down a well bore under high pressures to fracture the rock formation surrounding the well bore. The pressure is then released allowing the oil or gas to seep through the fractures into the well bore where it is then pumped to the surface.

In the hydraulic fracturing operation, a high velocity is required and extremely high pressure drops are encountered resulting in large losses of energy. In hydraulic fracturing, it is necessary to inject sufficient amounts of fracturing fluids to build up the required pressure in the well in order to effectuate cracks or fractures in the subterranean formation. Pressures as high as 3,000 to 10,000 psi measured at the surface are often required. Because of the large quantities of fluid needed, the high velocities required, and the general irregularities of the formation, it is difficult to obtain satisfactory results in many fracturing operations because of the energy loss. Thus, a method of reducing this friction (energy) loss is greatly desirable.

It is, therefore, the principal object of this invention to provide a polymeric additive which reduces the friction loss in flowing aqueous fluids, especially as applied in the hydraulic fracturing of subterranean formations.

Most commonly, fresh water or aqueous brine are used as the fracturing medium in oil field operations. The brines usually contain from a few parts per million to high percentages of dissolved salts. In fact, oil field brines sometimes contain total dissolved solids of up to about 10 percent or higher. Particularly, common brines which are difficult to use with polymeric additives are those having dissolved alkaline earth metal salt concentrations of more than 1,000 ppm. Most oil field brines contain at least several hundred ppm of calcium in addition to 2 percent or more sodium chloride and potassium chloride.

In addition, it is also well known in the art of producing oil or gas from a subterranean formation that fluid production can occasionally be stimulated by injecting acid solutions into the formation by way of the well bore. This is especially true when the reservoir contains large amounts of carbonate rock such as limestone, dolomite, and the like. The acid reacts with the carbonate content of the rock, thereby creating channels in the rock between the reservoir and the well bore. This increases the effective drainage area of the well bore, stimulating production.

The most commonly used acid for this purpose is hydrochloric. However, other acids such as hydrofluoric, nitric, formic, acetic and sulfonic have also been highly successful in increasing production in calcareous formations. Mixtures of two or more different acids have also been used, especially mixtures containing hydrofluoric acid. The acids are usually employed as 1 percent to 35 percent by weight solutions in water. However, because of the scarcity of fresh water and economics, it is often necessary to employ oil field brine as the aqueous medium in place of water. In these cases, the aqueous medium will be an acidic brine.

Acidizing and hydraulic fracturing are generally combined into one treatment by employing an acidic fluid under hydraulic fracturing pressures. This combination treatment of the well is called acid fracturing and it stimulates production by obtaining the benefits of both the chemically created channels and the pressure created fractures. When acid fracturing, the aqueous fluid may be an acid solution or an acidic brine as described above.

It has become the common practice in the oil field art to add friction-reducing polymers to the fracturing fluids to reduce turbulence and subsequent energy loss as the fracturing fluid is forced from the surface into the subterranean formation. For example, see U.S. Pat. No. 3,023,760 which discloses the use of sodium polystyrene sulfonate as a friction reducer and U.S. Pat. Nos. 3,102,548; 3,254,719 and 3,370,650 which disclose the use of polyacrylamides as friction reducers. In addition, see U.S. Pat. Nos. 3,451,480 and 3,537,525 which disclose the use of polymers containing diacetone acrylamide as friction reducers. Finally, see U.S. Pat. No. 3,562,226 which discloses the use of polymers containing dialkyl diallyl quaternary ammonium groups as friction reducers.

While most of these above-mentioned friction reducers are effective and have been somewhat of a success, many of them suffer from one or more drawbacks. For example, some of the polymers have a tendency to precipitate in the presence of the highly concentrated dissolved inorganic salts. Some of the polymers are relatively unstable at the elevated temperatures found in most subterranean formations. In addition, the viscosities of many of the polymers are greatly decreased in the presence of brine or acid. It has been known for years that partially hydrolyzed polyacrylamide, when dissolved in pure water, forms a much more viscous solution than the unhydrolyzed polyacrylamides. However, most of this viscosity increase is lost in water containing high concentrations of dissolved inorganic salts and/or acids. This loss of viscosity seriously affects the friction-reducing properties of the polymer. Also, many of these prior art polymers are not shear stable, especially in the presence of dissolved inorganic salts and/or acids. Because of the extremely high velocities, it is important that the polymers be shear stable. Finally, many of the polymers are not as effective as desired and new and improved friction-reducing additives are always desirable. Moreover, none of the prior art compounds are effective in all of the different aqueous fracturing systems.

It is, therefore, an object of this invention to provide an improved friction reducer. It is a further object of this invention to provide a friction reducer that overcomes the defects of the prior art compounds.

We have found a series of polymeric friction reducers which are an improvement over the prior art compounds. The friction reducers of our invention are effective in fresh water, brines, and acidic fracturing fluids. In addition, they are temperature stable and shear stable. Finally, they are very effective at low concentrations. This combination of properties fulfills a long felt need by the art. The polymers of our invention are high molecular weight, water-soluble polymers containing dimethylaminomethyl acrylamide and may be prepared in any convenient manner, as for example, in the manner taught by U.S. Pat. Nos. 2,328,901 or 3,539,535.

The polymers useful in this invention should have high molecular weights, preferably of at least 100,000 and more preferably of at least 1,000,000, and should have a solubility in water of at least 0.25 percent.

The polymers recited herein should be employed in a fracturing fluid in concentrations of from about 10 to about 1,000 ppm, based on the weight of the fracturing fluid. For other conduits and under other pressure and flow conditions, concentrations of from 1 ppm to 2,500 ppm may be economical. In addition, the fracturing fluid may contain other additives which are commonly used in the fracturing process as understood by one skilled in the art. Examples of some of these optional additives are corrosion inhibitors, propping agents and fluid-loss additives. A further advantage of the polymers of the instant invention is their compatibility with conventional cationic corrosion inhibitors.

To demonstrate the effectiveness of our invention, we utilized a laboratory "friction loop" in which a test fluid is circulated through a pipe having an internal diameter of about 0.25 inches. Pressure measurements are made at points about five feet apart and the friction reduction results noted. In all cases, shear of 16,000 rpm was applied after 10 minutes.

Table I

| | | | Friction Reduction Results | | | Shear | |
|---|---|---|---|---|---|---|---|
| Sample | Grams | Fluid | Initial | 5 Min. | 10 Min. | 15 Min. | 20 Min. |
| DMAMPAM (5%) | 24 | F.W. | 70.7 | 62.9 | 57 | 48.6 | 43.2 |
| DMAMPAM (5%) | 48 | F.W. | 73.8 | 65.6 | 64.2 | 61.4 | 57.4 |
| DMAMPAM (5%) | 48 | 2% CaCl$_2$ | 72.9 | 64.8 | 61.3 | 58.2 | 52 |
| DMAMPAM (5%) | 48 | 10% NaCl | 73.5 | 65.6 | 62 | 57 | 51.5 |

DMAMPAM = Poly(Dimethylaminomethyl Acrylamide)

The following table (Table II) demonstrates the ability of poly(dimethylaminomethyl acrylamide) (DMAMPAM) to impart good viscosity in water over a wide range of pH, even at very low pH in a test utilizing a Fann Viscometer. The following data also demonstrate the ability of DMAMPAM to increase viscosity of concentrated acids currently used in industry to acidize producing oil wells, gas wells, and water intake wells.

Table II

| | Fann Viscosities | |
|---|---|---|
| rpm | 15% by Weight HCl Solution | 1% by Weight DMAMPAM in 15% by Weight HCl Solution |
| 100 | 3 cps | 68.1 cps |
| 200 | 2.4 cps | 49.8 cps |
| 300 | 2.4 cps | 41.3 cps |
| 600 | 2.2 cps | 30.0 cps |

The following table (Table III) demonstrates the temperature stability of poly(dimethylaminomethyl acrylamide) in a test in which 600 mg/1 DMAMPAM is dissolved in fresh water that is saturated with oxygen. Solution is placed in 2 glass bottles and stoppered. One sample is heated at 210°F. for 2 days, then cooled to room temperature. The viscosity of both the heated and unheated solutions are measured in a Brookfield Model LVT Viscometer.

Table III

| | Viscosity, cp | |
|---|---|---|
| rpm | Unheated | Heated |
| 3 | 5.3 | 9.2 |
| 6 | 5.0 | 8.2 |
| 12 | 4.65 | 7.15 |
| 30 | 4.14 | 6.32 |
| 60 | 3.80 | 5.61 |

As a basis for comparison, hydrolyzed polyacrylamide, when treated in a similar manner at this temperature, will lose about 10 to 50% of its solution viscosity.

We claim:

1. A method for reducing the friction loss of aqueous fluids flowing through a conduit comprising maintaining in the aqueous fluid an effective amount of a polymer of dimethylaminomethyl acrylamide having a molecular weight of at least 100,000.

2. A method as in claim 1 wherein at least 10 ppm of the polymer is maintained in the aqueous fluid.

3. A method for fracturing a subterranean well formation comprising injecting into the well under fracturing pressures an aqueous fracturing fluid containing a polymer of dimethylaminomethyl acrylamide having a molecular weight of at least 100,000 in an amount sufficient to reduce the friction loss of said aqueous fluid.

4. A method as in claim 3 wherein at least 10 ppm of the polymer is maintained in the aqueous fluid.

* * * * *